US012570559B2

(12) United States Patent
Du et al.

(10) Patent No.: US 12,570,559 B2
(45) Date of Patent: *Mar. 10, 2026

(54) METHODS AND SYSTEMS FOR TREATING PHOSPHOGYPSUM-CONTAINING WATER

(71) Applicant: Evoqua Water Technologies LLC, Pittsburgh, PA (US)

(72) Inventors: Wenxin Du, Dover, NH (US); Hao Dang, Dracut, MA (US); Justin Wayne Higgs, Nolensville, TN (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 773 days.

This patent is subject to a terminal disclaimer.

(21) Appl. No.: 17/270,039

(22) PCT Filed: Aug. 21, 2019

(86) PCT No.: PCT/US2019/047490
§ 371 (c)(1),
(2) Date: Feb. 22, 2021

(87) PCT Pub. No.: WO2020/041458

PCT Pub. Date: Feb. 27, 2020

(65) Prior Publication Data

US 2021/0323852 A1      Oct. 21, 2021

Related U.S. Application Data

(60) Provisional application No. 62/798,696, filed on Jan. 30, 2019, provisional application No. 62/846,952, filed on May 13, 2019.

(51) Int. Cl.
| | |
|---|---|
| *C02F 9/00* | (2023.01) |
| *B01D 61/02* | (2006.01) |
| *B01D 61/04* | (2006.01) |
| *C01C 1/24* | (2006.01) |
| *C05C 3/00* | (2006.01) |
| *C02F 1/20* | (2023.01) |
| *C02F 1/42* | (2023.01) |
| *C02F 1/44* | (2023.01) |
| *C02F 1/52* | (2023.01) |
| *C02F 1/66* | (2023.01) |
| *C02F 5/02* | (2023.01) |
| *C02F 101/10* | (2006.01) |
| *C02F 101/14* | (2006.01) |
| *C02F 101/16* | (2006.01) |

(52) U.S. Cl.
CPC .............. *C02F 9/00* (2013.01); *B01D 61/025* (2013.01); *B01D 61/04* (2013.01); *C01C 1/24* (2013.01); *C05C 3/00* (2013.01); *B01D 2311/02* (2013.01); *B01D 2311/04* (2013.01); *B01D 2311/2623* (2013.01); *B01D 2311/2642* (2013.01); *B01D 2311/268* (2013.01); *C02F 1/20* (2013.01); *C02F 1/42* (2013.01); *C02F 2001/425* (2013.01); *C02F 1/441* (2013.01); *C02F 1/5245* (2013.01); *C02F 1/529* (2013.01); *C02F 1/66* (2013.01); *C02F 5/02* (2013.01); *C02F 2101/105* (2013.01); *C02F 2101/14* (2013.01); *C02F 2101/16* (2013.01); *C02F 2301/046* (2013.01)

(58) Field of Classification Search
CPC ......... C02F 9/00; B01D 61/025; B01D 61/04; C01C 1/24; C05C 3/00
See application file for complete search history.

(56) References Cited

U.S. PATENT DOCUMENTS

| | | | |
|---|---|---|---|
| 4,392,959 A | 7/1983 | Coillet | |
| 6,652,758 B2 | 11/2003 | Krulik | |
| 6,916,427 B2 | 7/2005 | Roth | |
| 2009/0306451 A1 | 12/2009 | Cerea | |
| 2011/0127223 A1 | 6/2011 | Astley et al. | |
| 2011/0132839 A1 | 6/2011 | Zuback et al. | |
| 2012/0070360 A1 | 3/2012 | Wissemborski et al. | |
| 2012/0315209 A1 | 12/2012 | Bisson et al. | |
| 2013/0062289 A1* | 3/2013 | Cote | C02F 1/5236 210/723 |
| 2014/0231359 A1 | 8/2014 | Cote et al. | |
| 2015/0308001 A1 | 10/2015 | Barak | |
| 2015/0368137 A1* | 12/2015 | Miller | C02F 1/66 210/709 |
| 2016/0002082 A1 | 1/2016 | Yin et al. | |
| 2017/0113957 A1 | 4/2017 | Eckelberry | |
| 2017/0362102 A1 | 12/2017 | Ganzi et al. | |

(Continued)

FOREIGN PATENT DOCUMENTS

| | | |
|---|---|---|
| CN | 1880217 A | 12/2006 |
| CN | 102328984 A | 1/2012 |

(Continued)

OTHER PUBLICATIONS

Google search "Waste water treatment hardness level for disposal water precipitation" (Jan. 31, 2025).*
Minnesota Rural Water Association—Lime-Soda Ash Softening—Downloaded_01312025.*
Da Silva, Gilson, "Search Report", Brazilian patent application No. BR112021003175-8, mailed Dec. 26, 2022, 7 pages.
Da Silva, Gilson, "Examination Report", Brazilian Patent Application No. BR112021003110-3, mailed May 16, 2023, 7 pages.

(Continued)

*Primary Examiner* — Yong L Chu

(57) ABSTRACT

Methods for processing pretreated phosphogypsum wastewater are disclosed. Precipitation of select constituents may be promoted to control a hardness level of the pretreated wastewater. Ammonia may then be removed from the process stream via reverse osmosis. A membrane contactor and/or polishing unit(s) may optionally be used. Related systems are also disclosed.

16 Claims, 2 Drawing Sheets

(56)                    References Cited

U.S. PATENT DOCUMENTS

| | | | | |
|---|---|---|---|---|
| 2022/0259085 A1* | 8/2022 | Dang | ........................ | C02F 9/00 |
| 2023/0145108 A1* | 5/2023 | Du | ........................... | C02F 1/20 |
| | | | | 210/750 |

FOREIGN PATENT DOCUMENTS

| | | | | | |
|---|---|---|---|---|---|
| CN | 106966467 | A | | 7/2017 | |
| CN | 107381892 | A | | 11/2017 | |
| KR | 100556686 | B1 | | 3/2006 | |
| WO | 2005118222 | A2 | | 12/2005 | |
| WO | 2007148954 | A1 | | 12/2007 | |
| WO | 2014136651 | A1 | | 9/2014 | |
| WO | 2015000462 | A1 | | 1/2015 | |
| WO | WO-2015118222 | A1 | * | 8/2015 | ............ H04N 5/235 |
| WO | 2016201563 | A1 | | 12/2016 | |

OTHER PUBLICATIONS

Perpich, B., Jr., "Mobile Wastewater Helps Remediate Concentrated Acidic Process Water at Fertilizer Plant," Florida Water Resources Journal, p. 24, Jul. 2005.

Issiouy et al, "Thermal treatment of moroccan phosphogypsum", Published by Chemical Department, Faculty of Sciences, Ibn Zohr University, B.P. 8106, Agadir 80000, Morocco, full text in foreign language with English Abstract, published Mar. 2013. (Year: 2013).

Samad, "Investigation of the Radiological Impact on the Coastal Environment Surrounding a Fertilizer Plant", Journal of Environmental Radioactivity, pp. 69-74 (2014).

Sadrzadeh, Mohtada et al., "Sea water desalination using electrodialysis", Science Direct, Desalination 221, pp. 440-447 (2008).

El-Ghafari, Rasha, "Requisition by the Examiner in Accordance With Subsection 86(2) of the Patent Rules", Canadian Patent Application No. 3107313, mailed Jan. 7, 2025.

El-Ghafari, Rasha, "Requisition by the Examiner in Accordance With Subsection 86(2) of the Patent Rules", Canadian Patent Application No. 3107306, mailed Jan. 7, 2025.

El-Ghafari, Rasha, "Requisition by the Examiner in Accordance With Subsection 86(2) of the Patent Rules", Canadian Patent Application No. 3107164, mailed Dec. 20, 2024.

Dias-Abey, Asoka, "Examination Report No. 1", Australian Patent Application No. 2019325324, mailed Jul. 3, 2024.

De Souza, Sandra, "Technical Examination Report", Brazilian Patent Application No. BR112021003175-8, mailed Aug. 21, 2025, 12 pages.

* cited by examiner

METHODS AND SYSTEMS FOR TREATING PHOSPHOGYPSUM-CONTAINING WATER

CROSS-REFERENCE TO RELATED APPLICATIONS

This application is a National Phase Application of International Application Serial No. PCT/US2019/047490, filed Aug. 21, 2019 and titled "METHODS AND SYSTEMS FOR TREATING PHOSPHOGYPSUM-CONTAINING WATER," which claims priority to U.S. Provisional Patent Application Ser. No. 62/720,566 filed on Aug. 21, 2018 and titled "METHOD AND SYSTEM TO TREAT PHOSPHO-GYPSUM CONTAINING WASTEWATER," U.S. Provisional Patent Application Ser. No. 62/770,470 filed on Nov. 21, 2018 and titled "IMPROVED LIMING PROCESS OF ACIDIC WATER FOR PHOSPHATE RECOVERY AND SCALING REDUCTION FOR DOWNSTREAM PROCESSES," U.S. Provisional Patent Application Ser. No. 62/798,696 filed on Jan. 30, 2019 and titled "AMMONIA/AMMONIUM REDUCTION DURING INDUSTRIAL ACIDIC WASTEWATER TREATMENT," and U.S. Provisional Patent Application Ser. No. 62/846,952 filed on May 13, 2019 and titled "USING MONO-VALENT CATION SELECTIVE AND ANION ION EXCHANGE MEMBRANES IN ELECTRODIALYSIS TO TREAT DOUBLE LIME TREATED POND WATER," the entire disclosure of each of which is hereby incorporated herein by reference in its entirety for all purposes.

FIELD OF THE TECHNOLOGY

Aspects relate generally to water treatment and, more specifically, to the treatment of water containing phosphogypsum.

BACKGROUND

Phosphoric acid is a precursor compound in the manufacture of various common fertilizers. Phosphogypsum is a side product from the production of phosphoric acid by treating phosphate ore with sulfuric acid. The reaction produces phosphogypsum sludge, phosphoric acid, and a byproduct liquid stream. The byproduct stream is typically reused for cooling but ultimately stored in large open-air enclosures called phosphogypsum stacks or ponds.

This wastewater associated with and produced by phosphate manufacturing operations is typically acidic and typically contains various dissolved constituents such as fluoride, ammonia, silica, sulfate, calcium, heavy metals, phosphate, magnesium, colloidal matter, organic carbon, and, in some instances, radium (a radioactive element). The ponds associated with phosphate processing contain billions of gallons of this wastewater, e.g. 3 billion gallons each. Due to increasingly strict environmental regulations and annual rainfall, the stacks must be treated and closed by the operating companies. The pond water has become one of the largest liabilities of phosphoric acid producers. There is an urgent environmental need to treat this wastewater, particularly in environmentally sensitive areas, or areas where population growth has come into closer contact with phosphate processing sites. Treatment of this wastewater to reduce its toxicity and its volume has been a technological challenge of significant interest. The toxic or harmful contaminants must be either reduced or eliminated before treated water can be discharged into the environment.

SUMMARY

In accordance with one or more aspects, a method of treating phosphogypsum-containing water is disclosed. The method may comprise promoting precipitation of at least one target hardness species from a pretreated supernatant to produce a process stream having a predetermined hardness level, removing ammonia from the process stream having the predetermined hardness level to produce treated water meeting at least one predetermined discharge requirement, and discharging the treated water.

In some aspects, the predetermined hardness level may be about 100 ppm or less. Promoting precipitation of at least one target hardness species may comprise precipitating calcium carbonate. Soda ash may be introduced to the pretreated supernatant to promote precipitation of calcium carbonate. The at least one predetermined discharge requirement may pertain to a conductivity limit or a level of ammonia, fluoride, or phosphorous.

In some aspects, removing ammonia may involve introducing the process stream to a reverse osmosis (RO) unit operation. The RO unit operation may comprise a dual-pass RO unit operation. The method may further comprise promoting passage of non-ionized ammonia through the RO unit. A pH level of the process stream may be adjusted to promote the passage of non-ionized ammonia.

In some aspects, the method may further comprise producing ammonium sulfate. A RO permeate may be introduced to a gas transfer membrane contactor. The method may further Comprise introducing sulfuric acid to the gas transfer membrane contactor. The method may further comprise delivering the ammonium sulfate downstream for use as a fertilizer.

In some aspects, the pretreated supernatant is sourced from a double lime treatment (DLT) operation.

In some aspects, the method may further comprise polishing the treated water prior to discharge. The treated water may be introduced to an ion exchange (IX) unit operation. The IX unit operation may comprise cation exchange resin. The method may further comprise returning an RO concentrate stream to a source of the phosphogypsum-containing water. The method may still further comprise returning a polishing rinse stream to a source of the phosphogypsum-containing water.

In accordance with one or more aspects, a system for treating phosphogypsum-containing water is disclosed. The system may comprise a source of pretreated supernatant, a precipitation subsystem fluidly connected downstream of the source of pretreated supernatant and configured to produce a process stream having a predetermined hardness level, an ammonia removal subsystem fluidly connected downstream of the precipitation subsystem and configured to produce treated water meeting at least one predetermined discharge requirement, and a treated water outlet.

In some aspects, the ammonia removal subsystem may comprise an RO unit. The RO unit may be a dual-pass RO unit. The ammonia removal subsystem may further comprise a gas transfer membrane contactor fluidly connected downstream of the RO unit.

In some aspects, the system may further comprise a polishing subsystem fluidly connected downstream of the ammonia removal subsystem. The polishing subsystem may comprise an IX unit operation. The IX unit operation may comprise cation exchange resin.

In some aspects, a concentrate side of the ammonia removal subsystem may be fluidly connected to a source of the phosphogypsum-containing water. A rinse stream of the polishing subsystem may be fluidly connected to a source of the phosphogypsum-containing water.

In some aspects, at least one sensor may be configured to detect an operational parameter associated with the source of pretreated supernatant, the precipitation subsystem, the ammonia removal subsystem, or the treated water outlet. The sensor may be a flow rate, pH, temperature, conductivity, hardness, or concentration sensor. The system may further comprise a controller in communication with the at least one sensor. The controller may be configured to adjust a flow rate or pH level in response to input from the sensor.

In accordance with one or more aspects, a method of facilitating treatment of phosphogypsum-containing water is disclosed. The method may comprise providing instructions to perform a double lime treatment (DLT) operation on the phosphogypsum-containing water, providing instructions to adjust a hardness level of a resulting DLT supernatant, providing an ammonia removal subsystem, and providing instructions to operate the ammonia removal subsystem to produce treated water meeting at least one predetermined discharge requirement.

In some aspects, the method may further comprise providing instructions to adjust a pH level of a process stream entering a reverse osmosis unit of the ammonia removal subsystem to control flow through to a downstream membrane contactor of the ammonia removal subsystem. The method may further comprise providing instructions to operate the membrane contactor to produce ammonia sulfate.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
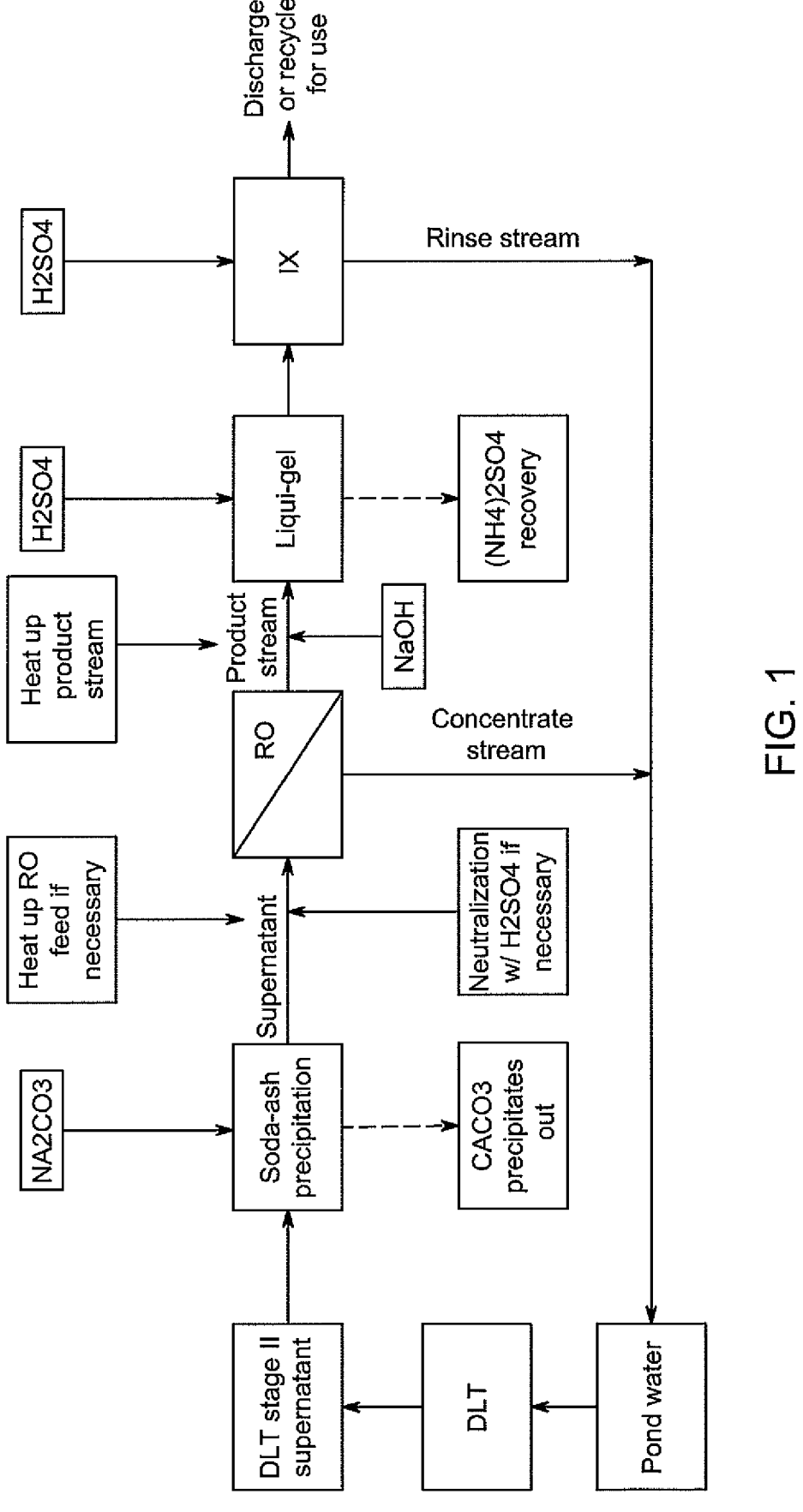
FIG. 1 presents a process flow diagram of a water treatment system including a membrane contactor in accordance with one or more non-limiting embodiments.

In accordance with one or more embodiments, water containing phosphogypsum may be efficiently brought to within preestablished environmental discharge limits. As used herein, the term phosphogypsum-containing water may interchangeably be referred to herein as wastewater or process water. In some embodiments, various product streams (i.e. calcium carbonate and/or ammonium sulfate) may beneficially be recovered in conjunction with the wastewater treatment. In at least some embodiments, a cost competitive alternative to conventional treatment methods is presented. In some embodiments, consumption of fresh water associated with environmental discharge may desirably be reduced. In at least some embodiments, there is no dilution prior to discharge.

In accordance with one or more embodiments, phosphogypsum wastewater may originate from a phosphate manufacturing operation and be stored in a pond or stack. The phosphogypsum wastewater may be highly acidic, i.e. having a pH level of about 1.5 to about 2 and environmentally hazardous. A non-limiting example of the typical chemical composition of pond water is presented in Table 1. Beyond what is presented, the ammonia concentration may range from a few hundred ppm up to a few thousand ppm.

TABLE 1

| Parameter[a] | Range |
|---|---|
| pH, Standard Units | 1.6-2.1 |
| Total Acidity, as $CaCO_3$ | 20,000-60,000 |
| Fluoride, as F | 4,000-12,000 |
| Phosphorus, as P | 4,000-9,000 |
| Silicon, as Si | 1,000-3,000 |
| Total Solids | 20,000-50,000 |
| Total Suspended Solids | 50-250 |
| Conductivity, umhos | 15,000-40,000 |
| Chlorides, as Cl | 50-500 |
| Sulfates, as $SO_4$ | 2,000-12,000 |
| Sodium, as Na | 50-3,000 |
| Calcium, as Ca | 50-1,500 |
| Magnesium, as Mg | 50-400 |
| Aluminum, as Al | 50-1,000 |
| Chrome, as Cr | 0.2-5.0 |
| Zinc, as Zn | 1.0-5.0 |
| Iron, as Fe | 100-250 |
| Manganese, as Mn | 5-30 |
| $NH_3$—N, as N | 0-1,200 |
| Total Organic N, as N | 3-30 |
| Color, APHA units | 20-4,000 |

[a]All values expressed as mg/L unless otherwise noted.

One conventional approach that may be used to dispose of phosphogypsum wastewater is deep well injection. This process injects the wastewater deep underground between impermeable layers of rocks to avoid polluting fresh water supplies. Proper geology is required for deep well injection sites, and a permit must be obtained prior to injecting the process water underground. Further, phosphate is not recoverable from process water in a deep well injection process.

In accordance with one or more embodiments, wastewater containing phosphogypsum may be pretreated. In some embodiments, the wastewater may be pretreated via conventional double lime treatment (DLT). DLT, or double liming, is generally a process in which lime is added in two stages to promote the precipitation of various constituents, i.e. fluoride species in a first stage, and phosphate species in a second stage. Some constituents that can be found in water, such as fluoride and phosphate, tend to form soluble acids under acidic conditions. Limestone and lime may be used to neutralize and remove these total dissolved solids (TDS). DLT has emerged as a widely employed process for treating pond water in view of its volume and chemical complexity. Non-limiting examples of the typical composition of DLT (stage-2) supernatant is presented in Tables 2A and 2B.

TABLE 2A

| Parameter[a] | Process Cooling Pond Water | Stage II Supernatant |
|---|---|---|
| pH, Std. Units | 1.70 | 9.0 |
| Acidity, as $CaCO_3$ | 32,800 | — |
| Fluoride, as F | 6,600 | 12-20 |
| Total P | 4,000 | 1-13 |
| Total Suspended Solids | 69 | 15 |
| Chlorides, as Cl | 72 | 75 |
| Sulfates, as $SO_4$ | 6,200 | 2,709 |
| Sodium as Na | 896 | 900 |
| Calcium, as Ca | 77 | 375 |
| Magnesium, as Mg | 44 | 22 |

TABLE 2A-continued

| Parameter[a] | Process Cooling Pond Water | Stage II Supernatant |
|---|---|---|
| Aluminum, as Al | 389 | <0.2 |
| Chrome, as Cr | 0.43 | <0.10 |
| Zinc, as Zn | 1.46 | <0.10 |
| Iron, as Fe | 263 | 0.10 |
| Manganese, as Mn | 7.9 | 0.03 |
| Boron, as B | 0.90 | 0.50 |
| Lead, as Pb | <0.10 | <0.10 |

[a]All values in mg/L unless otherwise noted.

TABLE 2B

| CATIONS | RESULT | UNITS | ANIONS | RESULT | UNITS |
|---|---|---|---|---|---|
| Calcium (Ca) | 705 | mg/l CacO3 | Bicarb (HCO3) | <0.5 | mg/l CaCO3 |
| Magnesium (Ma) | 6.41 | mg/l CaCO3 | Carbonate (CO3) | 343.6 | mg/l CaCO3 |
| Sodium (Na) | 2290 | mg/l CaCO3 | Hydroxide (OH) | 1177.3 | mg/l CaCO3 |
| Potassium (K) | 250 | mg/l CaCO3 | Fluoride (F) | 22.1 | mg/l CaCO3 |
| Iron (Fe) | 0.098 | mg/l | Chloride (Cl) | 185 | mg/l CaCO3 |
| Manganese (Mn) | <0.010 | mg/l | Bromide (Br) | 3.89 | mg/l CaCO3 |
| Aluminum (Al) | <0.050 | mg/l | Nitrate (NO3) | 12.4 | mg/l CaCO3 |
| Barium (Ba) | <0.050 | mg/l | Phosphate (PO4) | <0.800 | mg/l CaCO3 |
| Strontium (Sr) | 0.167 | mg/l | Sulfate (SO4) | 3200 | mg/l CaCO3 |
| Copper (Cu) | <0.020 | mg/l | Silica (SiO2) | 104 | mg/l CaCO3 |
| Zinc (Zn) | <0.020 | mg/l | | | |

| OTHER PARAMETERS | RESULT | UNITS | | RESULT | UNITS |
|---|---|---|---|---|---|
| pH | 10.60 | | Total Hardness | 711.91 | mg/l CaCO3 |
| Turbidity | 16.0 | NTU | TOC (C) | 48.72 | mg/l |
| Conductivity | 6505 | uS/cm | Free (CO2) [1] | 0.1 | mg/l CaCO3 |
| | | | [1] Derived from Alkalinity and pH | | |

| ADDITIONAL TESTS | RESULT | UNITS |
|---|---|---|
| (In-Field) pH | 10.7 | |
| Ammonia (NH3) | 1326.822 | mg/l CaCO3 |
| Colloidal Silica (SiO2) | <0.02 | mg/l CaCO3 |

While heavy metal and phosphate contents may be reasonably low in the DLT supernatant, ammonia, sulfate, and/or hardness levels may still be quite high. Notably, while conventional DLT reduces the level of various undesirable constituents including those associated with phosphogypsum, DLT does not sufficiently treat the wastewater so as to meet relevant discharge limits, such as those which may be established by local, state, federal, or private agencies. For example, the State of Florida has set a maximum conductivity limit of 1,275 µS/cm for National Pollutant Discharge Elimination System (NPDES) permitting. Currently, wastewater treated via DLT is diluted by up to five to ten times in order to meet conductivity, concentration, and/or load-based limits for ammonia, fluoride, phosphorous, or other constituents. The water consumed for dilution is typically fresh or treated water that could be used for other purposes. The dilution water may be relatively expensive treated water, such as reverse osmosis product water.

In accordance with one or more embodiments, pretreated phosphogypsum wastewater may be further processed to allow for its discharge. Any other process stream with similar chemical compositions, for example, another semi-treated acidic supernatant, may likewise be treated. In at least some embodiments, the phosphogypsum wastewater may have been pretreated via DLT. The further treatment may meet relevant discharge standards with respect to conductivity, ammonia, fluoride, and/or phosphorous levels. In some embodiments, the pretreated wastewater is not diluted for discharge. The treated water may also be suitable for one or more downstream uses, such as for irrigation or other potable use.

In accordance with one or more embodiments, a hardness level of pretreated phosphogypsum wastewater may be adjusted. In some embodiments, soda ash may be added to the pretreated wastewater in order to reduce magnesium and/or calcium levels down to acceptable levels. Other compounds capable of adjusting hardness levels may also be used. Adjusting hardness may facilitate downstream processing and/or meeting relevant discharge requirements. For example, potential scaling may occur in a subsequent reverse osmosis process as described further herein if the calcium level is too high. In some embodiments, hardness adjustment may promote precipitation of calcium carbonate. In at least some embodiments, calcium levels may be reduced to about 30 ppm or less. In some non-limiting embodiments, total hardness (i.e. calcium and magnesium) may be reduced to about 100 ppm or less, e.g. to within a range of about 50 ppm to about 100 ppm. The amount of compound, i.e. soda ash, added may depend on a hardness level of the pretreated phosphogypsum wastewater, intended downstream unit operations, and/or discharge requirements.

In accordance with one or more embodiments, ammonia levels in the wastewater may then be addressed subsequent to any adjustment of hardness. In some embodiments, the process stream may be introduced to a reverse osmosis (RO) unit operation. Reverse osmosis generally involves separating water from a solution of dissolved solids by forcing water through a semi-permeable membrane. Reverse osmosis may treat water having a low pH level to remove contaminants by using one or more passes of reverse osmosis membranes, with or without controlling the pH level between passes. As pressure is applied to the solution, water and other molecules with low molecular weight and low ionic charge pass through small pores in the membrane. Larger molecules and those with higher ionic charge are rejected by the membrane. Some constituents that can be found in water, such as ammonia, tend, under acidic conditions, to form salts that are easily rejected by the membranes.

Ammonia may be found in various process streams, including the pretreated supernatant and the precipitation supernatant.

In accordance with one or more embodiments, a significant portion of ammonia remediation may be attributable to a RO subsystem. Various RO technologies may be implemented based on desired operations, available capital, and other considerations. In some embodiments, single-pass RO may be used. In some non-limiting embodiments, a dual-pass RO system may be implemented such as that described in U.S. Pat. No. 4,574,049. The pH level of permeate from first pass reverse osmosis membranes can be adjusted upwards towards neutral conditions between the first and second pass membranes in order to make it easier to remove constituents that tend to exist in soluble form under highly acidic conditions. In some non-limiting embodiments, the RO subsystem may be run at a recovery of up to about 80%, 85%, 90% or more.

In some embodiments, a pH level of wastewater entering the RO subsystem may be adjusted down, such as via acid (e.g. sulfuric acid) addition, to facilitate treatment. A pH level of wastewater entering the RO unit operation may also control an amount of ammonia gas that passes through the RO unit operation. Thus, in some embodiments, a pH level of the process stream may be strategically controlled to allow a predetermined amount of non-ionized ammonia gas to pass through the RO subsystem. In some specific embodiments, a process stream having a pH level of about 8 to about 10 may enter the RO system.

In some embodiments, the temperature of wastewater entering the RO subsystem may be changed, such as heating and cooling the liquid. Temperature of the wastewater entering the RO is important in controlling the amount of ammonia gas that passes through the RO unit operation. Thus, in some embodiments, the temperature may be strategically controlled (along with other parameters such as pH) to allow a predetermined amount of non-ionized ammonia gas to pass through the RO subsystem.

In accordance with one or more embodiments, a controlled amount of ammonia gas may optionally be separated out downstream of the RO subsystem, such as by using a gas transfer membrane contactor. For example, a Liqui-Cel™ gas transfer membrane contactor commercially available from 3M Company may be implemented. In some embodiments, the gas transfer membrane contactor may remove about 90% to about 99% of residual non-ionized ammonia in the RO permeate. This combination of RO treatment and a gas transfer membrane contactor may allow for controlled removal of ammonia and ammonium with possible recovery of ammonia, such as in the form of ammonium sulfate. Ammonium sulfate may be delivered for downstream use, such as for use as a fertilizer.

In some embodiments, a temperature downstream of the RO subsystem may be changed, such as heating and cooling the liquid. Temperature of the stream entering the membrane contactor may be important in controlling the amount of ammonia gas that passes through the membrane. Thus, in some embodiments, the temperature may be strategically controlled (along with other parameters such as pH) to allow a predetermined amount of non-ionized ammonia gas to pass through.

Antiscalants can be added before reverse osmosis membranes. Typically, antiscalants are materials that interfere with precipitation reactions by mechanisms such as crystal modification in which negative groups located on the antiscalant molecule attack the positive charges on scale nuclei interrupting the electronic balance necessary to propagate the crystal growth. Similarly, some antiscalants adsorb on crystals or colloidal particles and impart a high anionic charge, which tends to keep the crystals separated.

Some methods and systems may include additional pretreatment before the RO membranes in order to remove constituents such as suspended solids that can clog the RO membranes.

In accordance with one or more embodiments, the process stream may be polished following ammonia removal. In some embodiments, polishing operations may be performed directly downstream of RO. In other embodiments, polishing operations may be performed following any gas transfer membrane contactor. Various polishing operations will be readily apparent to those skilled in the art. For example, an ion exchange (IX) process may produce a product water at or significantly below required limits for discharge. Cation exchange resin may remove residual ammonia and/or ammonium. In some embodiments, treatment methods and systems may include polishing technologies to reduce the residual concentrations of constituents for which allowable discharge concentrations are very low. Although these polishing technologies may be necessary to meet discharge criteria, they can add significantly to the overall treatment system operating costs.

FIG. 1 presents a process flow diagram in accordance with one or more embodiments. Pond water from a phosphate manufacturing operation may be stored in a pond and pretreated via conventional DLT. A hardness level of the DLT supernatant may be adjusted so as to promote precipitation of calcium carbonate. Likewise, precipitation may be promoted to achieve a predetermined hardness level. Supernatant having an adjusted hardness level may then be introduced to an RO unit. A pH level of the supernatant entering the RO unit may be adjusted, for example, to impact a flow-through level of ammonia. Optionally, an RO product stream may be introduced to a gas transfer membrane contactor to further target ammonia. For example, ammonia sulfate may be produced in the gas transfer membrane contactor as may be promoted by the addition of sulfuric acid.

One or more polishing operations, i.e. ion exchange treatment, may occur downstream of the RO and/or membrane contactor prior to discharge meeting preestablished criteria. As illustrated, a concentrate stream from the RO subsystem may be returned to the pond. Likewise, a rinse stream from any polishing subsystem may also be returned to the pond.

Figure 2:
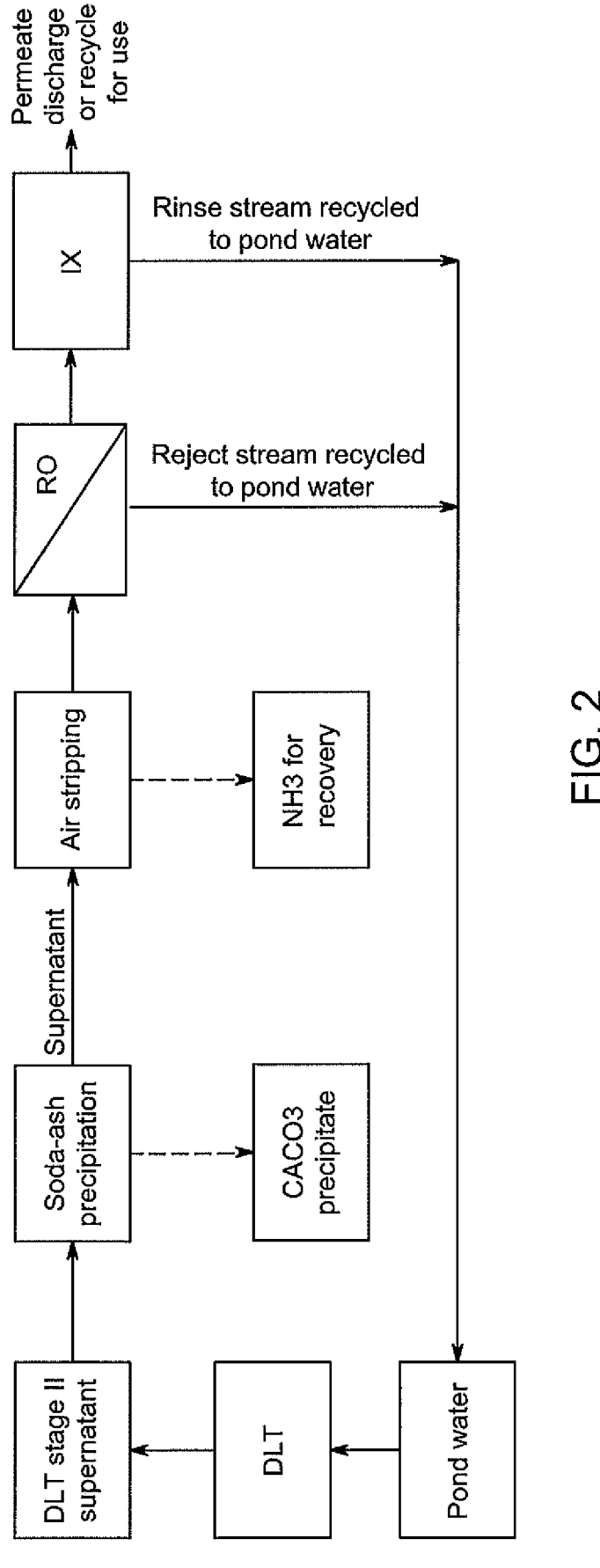
FIG. 2 presents a process flow diagram of a water treatment system including an air stripping unit operation in accordance with one or more non-limiting embodiments.

FIG. 2 presents an alternative embodiment in which supernatant from a precipitation unit operation is introduced to an air stripping unit operation for ammonia recovery. A process stream exiting the air stripping unit operation is then introduced to a RO treatment. An IX unit operation and/or further polishing unit operation may be included downstream of the RO treatment.

In accordance with one or more embodiments, a treatment system may include at least one sensor configured to detect an operational parameter. For example, the sensor may be configured to detect an operational parameter associated with the source of pretreated supernatant, the precipitation subsystem, the ammonia removal subsystem, or the treated water outlet. In some non-limiting embodiments, the sensor may be a flow rate, pH, temperature, conductivity, hardness, or concentration sensor. The system may further include a controller in communication with the at least one sensor. The controller may be configured to provide a control signal in response to input from the sensor. For example, the controller may provide a control signal to actuate or adjust a valve of the system or subsystem thereof. In some non-limiting embodiments, the controller may be configured to adjust a flow rate or pH level in response to input from the sensor. In this way, the controller can enable adjustment of one or more process parameters so as to produce one or more desirable product streams. In some non-limiting embodiments, the controller can adjust flow through the RO unit operation to a membrane contactor, for example, to promote ammonia sulfate recovery as described herein. The controller may be further configured to make a comparison between a measured value and a predetermined value, such as an established discharge requirement and to adjust various control settings accordingly.

The function and advantages of these and other embodiments can be better understood from the following example. The example is intended to be illustrative in nature and is not considered to be limiting the scope of the invention.

EXAMPLE

Table 3 presents simulated results of DLT supernatant treated in accordance with one or more disclosed embodiments. In the model, a DLT supernatant sample was subjected in series to: soda ash precipitation, RO treatment, gas transfer membrane contactor, and IX polishing. National Pollutant Discharge Elimination System (NPDES) standards were met.

10

$$\frac{\text{kg Na}_2\text{CO}_3}{\text{kgal wastewater}},$$

with 10% overdose. This unit process is expected to be run at ambient temperature in a continuously stirred tank reactor. The resulting low-hardness stream is fed to the RO unit. Given the optimization requirements for the RO in terms of temperature and pH for specific ammonia pass-through, the given example has the temperature set at 80° F. and a pH of around 9. For context, sites with this water have temperatures of 70° F., and expected pH from soda-ash precipitation to be around 9. Thus, temperature and (potentially) pH control are needed upstream of the RO.

RO modelling was done using industry projection software. Given the low hardness levels from the soda-ash precipitation, the RO recovery can be as high as 90% with antiscalant. This would not be possible without the hardness reduction step. For purposes of example, 80% recovery was chosen with two 1-pass RO model Vantage M86 Units in parallel with 204 units each. Antiscalant was used, specifically

TABLE 3

| | DLT Stage II Supernatant | Concentration (ppm) | Soda-ash precipitation (ppm) | Adjusted Feed (ppm) | RO Concentrate (ppm), 90% recovery | RO permeate | Gas Transfer Membrane Contactor | IX |
|---|---|---|---|---|---|---|---|---|
| Flow rate (GPM) | 1000 | 1000 | 1000 | 1000 | 200 | 800 | 800 | 800 |
| Cations | Na | 900 | 1371.12 | 1489.36 | 7334.35 | 28.11 | 28.11 | 28.11 |
| | Ca | 375 | 32 | 32 | 158.62 | 0.35 | 0.35 | 0.35 |
| | Mg | 22 | 22 | 22 | 109.05 | 0.24 | 0.24 | 0.24 |
| | Al | 0.2 | 0.2 | 0.2 | 0.96 | 0.01 | 0.01 | 0.01 |
| | Cr | 0.1 | 0.1 | 0.1 | | 0.13 | 0.13 | 0.13 |
| | Zn | 0.1 | 0.1 | 0.1 | | 0.13 | 0.13 | 0.13 |
| | Fe | 0.1 | 0.1 | 0.1 | 0.48 | 0.01 | 0.01 | 0.01 |
| | Mn | 0.03 | 0.03 | 0.03 | 0.14 | 0.00 | 0.00 | 0.00 |
| | B | 0.5 | 0.5 | 0.5 | | | | |
| | Pb | 0.1 | 0.1 | 0.1 | | | | |
| | K | | | | | | | |
| | Ba | | | | | | | |
| | Sr | | | | | | | |
| | Cu | | | | | | | |
| | Zn | | | | | | | |
| Anions | F | 20 | 20 | 20 | 97.41 | 0.65 | 0.65 | 0.65 |
| | P | 13 | 13 | 13 | 60.45 | 1.14 | 1.14 | 1.14 |
| | Cl | 75 | 75 | 75 | 370.27 | 1.18 | 1.18 | 1.18 |
| | SO4 | 2709 | 2709 | 4616 | 22972.02 | 27.00 | 27.00 | 27.00 |
| | HCO3 | | | | 0 | | | |
| | CO3 | | 100 | 0 | 0 | | | |
| | Br | | | | | | | |
| | NO3 | | | | | | | |
| | PO4 | | | | | | | |
| | NH3 | 2100 | 1365 | 1365 | 0 | 1706.25 | 68.25 | 0.1 |
| | NH4 | | 735 | 735 | 3529.84 | 36.29 | 36.29 | 0.1 |
| | TSS | 15 | 15 | | | 0.00 | 0.00 | 0.00 |
| | pH | 9 | 9 | 9 | 7 | 9.00 | 9.00 | 9.00 |

The soda ash precipitation unit significantly reduced the calcium level by introducing sodium carbonate to the stream through mixing. The projected consumption of chemical precipitation using Na$_2$CO$_3$ with the specified wastewater analysis is 3.87

$$37.2 \frac{\text{lb antiscalant}}{\text{day}}$$

of Vitec 3000. Membrane lifetime was projected to last for 6 months.

Following the RO unit, pH and temperature adjustment are required for feeding into the membrane contactor. Specifically, pH should be 10 by adjusting with NaOH and temperature to be heated up to target of 122° F. Projected usage of NaOH is around $$2.52 \frac{\text{kg NaOH}}{\text{m}^3 \text{feed}}.$$

Given these conditions, a high quantity of dissolved ammonia gas will be present. This will be passed through the membrane within the membrane contactor, with sulfuric acid on the other side. High reduction of total nitrogen within the membrane contactor can be seen. For this example, Liqui-Cel™ membrane contactor was used, with 96% removal rate of $NH_3$—N. 48 total G900 14×28×50 units were used with 9 acid pumps to supply sulfuric acid to the other side of the membrane contactor. A large amount of sulfuric acid is used in order to remove the desired free ammonia, with recoverable ammonium sulfate as fertilizer product.

The combined use of RO and the gas transfer membrane contactor was primarily responsible for ammonia and ammonium removal. The IX polishing further reduced the ammonia and ammonium levels to significantly below discharge requirements. Within the example, an IX was modelled with a C-211 resin in a 84×84 triplex system. Volume of resin was projected to be 157 ft$^3$ per vessel with 3 vessels per system. Resin lifetime was expected to be 3 years with around 2500 cycles (7 hr per cycle) per triplex system before needing replacement. Sulfuric acid is used to rinse the IX resin, whereby the low pH rinse stream can be returned to back to the pond water.

This specific sample was carried out due to the nature of the site. Dilution water is not readily available given the remote locations and typical ammonia levels prevent full use of the DLT process. Given that, this invention would have an advantage in that it will not only reduce the total ammonia levels of the wastewater but will also satisfy NPDES discharge limits.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A method of treating phosphogypsum-containing water, comprising:
   promoting precipitation of at least one target hardness species selected from one or both of a calcium species or a magnesium species from a pretreated supernatant to produce a process stream having a predetermined hardness level of about 100 ppm or less;
   removing non-ionized ammonia from the process stream having the predetermined hardness level using a gas transfer membrane contactor to produce treated water meeting at least one predetermined discharge requirement selected from a conductivity limit or a level of ammonia, fluoride, or phosphorous; and
   discharging the treated water.

2. The method of claim 1, wherein promoting precipitation of at least one target hardness species comprises precipitating calcium carbonate.

3. The method of claim 2, wherein soda ash is introduced to the pretreated supernatant to promote precipitation of calcium carbonate.

4. The method of claim 1, wherein removing non-ionized ammonia involves introducing the process stream to a reverse osmosis (RO) unit operation.

5. The method of claim 4, wherein the RO unit operation comprises a single-pass or a dual-pass RO unit operation.

6. The method of claim 4, wherein the non-ionized ammonia in the process stream is passed through the RO unit.

7. The method of claim 6, wherein a pH level of the process stream is adjusted to promote the passage of non-ionized ammonia.

8. The method of claim 1, further comprising producing ammonium sulfate.

9. The method of claim 1, further comprising introducing sulfuric acid to the gas transfer membrane contactor.

10. The method of claim 8, further comprising delivering the ammonium sulfate downstream for use as a fertilizer.

11. The method of claim 1, wherein the pretreated supernatant is sourced from a double lime treatment (DLT) operation.

12. The method of claim 1, further comprising polishing the treated water prior to discharge.

13. The method of claim 12, wherein the treated water is introduced to an ion exchange (IX) unit operation.

14. The method of claim 13, wherein the IX unit operation comprises cation exchange resin.

15. The method of claim 4, further comprising returning a RO concentrate stream to a source of the phosphogypsum wastewater.

16. The method of claim 12, further comprising returning a polishing rinse stream to a source of the phosphogypsum-containing water.

\* \* \* \* \*